United States Patent
Aimura et al.

(10) Patent No.: US 6,835,780 B2
(45) Date of Patent: Dec. 28, 2004

(54) NITRILE RUBBER COMPOSITION AND VULCANIZED RUBBER ARTICLE

(75) Inventors: Yoshiaki Aimura, Kawasaki (JP); Suguru Ito, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/239,839

(22) PCT Filed: Mar. 14, 2001

(86) PCT No.: PCT/JP01/02022

§ 371 (c)(1),
(2), (4) Date: May 12, 2003

(87) PCT Pub. No.: WO01/74940

PCT Pub. Date: Oct. 11, 2001

(65) Prior Publication Data

US 2003/0236355 A1 Dec. 25, 2003

(30) Foreign Application Priority Data

Mar. 30, 2000 (JP) .................................... 2000-094323

(51) Int. Cl.$^7$ ............................................. C08L 33/20
(52) U.S. Cl. ....................... 525/238; 525/942; 525/295; 525/329.1
(58) Field of Search ................................. 525/238, 295, 525/329.1, 942; 524/458

(56) References Cited

U.S. PATENT DOCUMENTS 4,452,936 A * 6/1984 Grimm ....................... 524/322
4,965,323 A 10/1990 Watanabe et al.

OTHER PUBLICATIONS

Japanese document No. 8–120184 published May 14, 1996 with abstract/Cited in the International Search Report.
Japanese document No. 57–036136 published Feb. 26, 1982 with abstract/Cited in the International Search Report.
Japanese document No. 11–293039 published Oct. 26, 1999 with abstract/Discussed in the specification.

* cited by examiner

Primary Examiner—William K. Cheung
(74) Attorney, Agent, or Firm—Armstrong, Kratz, Quintos, Hanson & Brooks, LLP

(57) ABSTRACT

A rubber composition comprising a nitrile rubber and incorporated therein an organic sulfonic acid salt. A vulcanized rubber article obtained by vulcanization of the rubber composition exhibits a reduced deterioration in tensile strength and elongation when kept in a hot-temperature air atmosphere.

13 Claims, No Drawings

NITRILE RUBBER COMPOSITION AND VULCANIZED RUBBER ARTICLE

TECHNICAL FIELD

This invention relates to a nitrile rubber composition having an enhanced heat aging resistance, and a vulcanized rubber article made by vulcanization thereof.

BACKGROUND ART

A nitrile rubber represented by an acrylonitrile-butadiene copolymer rubber (NBR) has hitherto been widely used as an oil-resistant rubber material for the production of rubber articles such as a seal, a hose and a belt. Hydrogenated NBR was developed for satisfying a demand of placing on the market a vulcanized rubber article having enhanced heat-aging resistance and high tensile strength, and thus, the use of nitrile rubbers has been more widened.

Hydrogenated NBR has a structure such that butadiene units in the molecular chain have been hydrogenated and thus the content of unsaturated bonds, i.e., double bonds, has been reduced to zero or an extremely small value. Therefore hydrogenated NBR has a remarkably enhanced resistance to oxidative degradation and is highly evaluated as a heat aging-resistant rubber.

However, as hydrogenated NBR still has unsaturated bonds even only in a minor amount, the heat aging resistance in a hot-air atmosphere is liable to be poor. Therefore, additives to be incorporated in NBR are being developed.

For example, Japanese Unexamined Patent Publication No. H11-293039 proposed the incorporation of a strong base, a salt of a strong base with a weak acid, or a salt of a weak acid in hydrogenated NBR to enhance the hot-air aging resistance, namely, heat aging resistance when the hydrog nated NBR is kept in a hot-air atmosphere.

The incorporation of the proposed ingredients can reduce the deterioration of elongation at break, i.e., ultimate elongation, as measured after the rubber is kept in a hot-air atmosphere, but, the deterioration of tensile strength cannot be reduced to a desired level.

DISCLOSURE OF THE INVENTION

A primary object of the present invention is to provide a nitrile rubber composition which is a rubber material giving a vulcanized rubber article exhibiting a reduced deterioration in tensile strength and elongation to the desired extent when kept in a hot air atmosphere.

The inventors conducted researches to achieve the above-mentioned object, and found that the incorporation an organic sulfonic acid salt in a nitrile rubber gives the desired results. Based on this finding, the present invention has been completed.

Thus, in accordance with the present invention, there are provided a rubber composition comprising a nitrile rubber and an organic sulfonic acid salt, wherein the amount of the organic sulfonic acid salt is in the range of 0.5 to 20 parts by weight based on 100 parts by weight of the nitrile rubber; and further a vulcanized rubber article made by vulcanizing this rubber composition.

BEST MODE FOR CARRYING OUT THE INVENTION

The nitrile rubber used in the present invention is a copolymer rubber made by copolymerization of an $\alpha,\beta$-ethylenically unsaturated nitrile monomer (a) with other monomer (b).

As specific examples of the monomer (a), there can be mentioned acrylonitrile, methacrylonitrile and $\alpha$-chloroacrylonitrile. Of these, acrylonitrile is preferable. These nitrile monomers (a) may be used either alone or in combination. The content of units of monomer (a) in the nitrile rubber is preferably in the range of 10 to 60% by weight, more preferably 12 to 55% by weight and especially preferably 15 to 50% by weight.

The monomer (b) to be copolymerized with the monomer (a) includes, for example, conjugated diene monomers, non-conjugated diene monomers, and $\alpha$-olefin monomers. In the case when the monomer (a) is copolymerized with a conjugated diene monomer, a copolymer rubber having a large iodine value tends to be produced. However, according to the need, the iodine value can be lowered further by hydrogenating the carbon-carbon unsaturated bonds in the copolymer rubber by a conventional procedure to produce a hydrogenated product.

As specific examples of the conjugated diene monomer, there can be mentioned 1,3-butadiene, isoprene, 2,3-dimethyl-1,3-butadiene and 1,3-pentadiene. Of these, 1,3-butadiene is preferable. In the case where the monomer (a), a conjugated diene monomer and an optional other copolymerizable monomer are copolymerized and optionally the copolymer rubber is further hydrogenated, the total amount of the units of non-hydrogenated conjugated diene monomer and the units of hydrogenated conjugated diene monomer in the copolymer rubber is preferably in the range of 40 to 90% by weight, more preferably 45 to 88% by weight and especially preferably 50 to 85% by weight.

The non-conjugated diene monomer preferably includes those which have 5 to 12 carbon atoms, and, as specific examples thereof, there can be mentioned 1,4-pentadiene, 1,4-hexadiene, vinylnorbornene and cyclopentadiene.

The $\alpha$-olefin monomer preferably includes those which have 2 to 12 carbon atoms, and, as specific examples thereof, there can be mentioned ethylene, propylene, 1-butene, 4-methyl-1-pentene, 1-hexene and 1-octene.

As other examples of the monomer (b), there can be mentioned $\alpha,\beta$-ethylenically unsaturated carboxylic acid ester monomers, aromatic vinyl monomers, fluorine-containing vinyl monomers, $\alpha,\beta$-ethylenically unsaturated monocarboxylic acid monomers, $\alpha,\beta$-ethylenically unsaturated dicarboxylic anhydride monomers, and copolymerizable antioxidants.

As specific examples of the $\alpha,\beta$-ethylenically unsaturated carboxylic acid ester monomers, there can be mentioned alkyl acrylates and alkyl methacrylates, each alkyl group of which has 1 to 18 carbon atoms, such as methyl acrylate, ethyl acrylate, n-butyl acrylate, n-dodecyl acrylate, methyl methacrylate and ethyl methacrylate; alkoxyalkyl acrylates and alkoxyalkyl methacrylates, each alkoxyalkyl group of which has 2 to 12 carbon atoms, such as methoxymethyl acrylate, methoxymethyl methacrylate and methoxyethyl methacrylate; cyanoalkyl acrylates and cyanoalkyl methacrylates, each cyanoalkyl group of which has 2 to 12 carbon atoms, such as $\alpha$-cyanoethyl acrylate, $\beta$-cyanoethyl acrylate and cyanobutyl methaorylate; hydroxyalkyl acrylates and hydroxyalkyl methacrylates, each hydroxyalkyl group has 1 to 12 carbon atoms, such as 2-hydroxyethyl acrylate, 2-hydroxyethyl methacrylate and hydroxypropyl acryalte; $\alpha,\beta$-ethylenically unsaturated dicarboxylic acid alkyl esters such as monoethyl maleate, dimethyl maleate, dimethyl fumarate, dimethyl itaconate, diethyl itaconate and di-n-butyl itaconate; amino group-containing $\alpha,\beta$-ethylenically unsaturated carboxylic acid esters such as dimethylaminoethyl acrylate and diethylaminoethyl acrylate; fluoroalkyl group-containing acrylates and fluoroalkyl group-containing methacrylates, such as trifluoroethyl acrylate and tetrafluoropropyl methacrylate; and fluorine-substituted benzyl acrylates and fluorine-substituted benzyl methacrylates, such as fluorobenzyl acrylate and fluorobenzyl methacrylate.

As specific examples of the aromatic vinyl monomer, there can be mentioned styrene, α-methylstyrene and vinylpyridine. As specific examples of the fluorine-containing vinyl monomer, there can be mentioned fluoroethyl vinyl ether, fluoropropyl vinyl ther, o-trifluoromethylstyrene, vinyl pentafluorobenzoate, difluoroethylene and tetrafluoroethylene. As specific examples of the α,β-ethylenically unsaturated carboxylic acid monomer, there can be mentioned acrylic acid, methacrylic acid, itaconic acid, fumaric acid, maleic acid and maleic anhydride. As specific examples of the copolymerizable antioxidant, there can be mentioned N-(4-anilinophenyl)-acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline and N-phenyl-4-(4-vinylbenzyloxy)aniline.

The above-recited copolymerizable monomers can be used either alone or as a combination of at least two thereof.

The Mooney viscosity ($ML_{1+4}$, 100° C.), as measured according to JIS K6300, of the nitrile rubber used in the present invention is not particularly limited, but is preferably in the range of 20 to 140 and more preferably 30 to 120. If the Mooney viscosity is too large, the mechanical strength is low. In contrast, if the Mooney viscosity is too large, the processability becomes poor.

The iodine value, as measured according to JIS K6235, of the nitrile rubber used in the present invention is also not particularly limited, but is preferably not larger than 120, more preferably not larger than 60 and especially preferably not larger than 30. If the iodine value is too large, the hot-air aging resistance is low. In the case when the iodine value is too large, unsaturated bonds in the molecule chain of rubber may be saturated by hydrogenation reaction.

The nitrile rubber is produced usually by radical copolymerization of the above-mentioned monomers, or by said radical copolymerization followed by hydrogenation. The polymerization may be carried out by a conventional procedure, which may be any of emulsion polymerization, suspension polymerization and solution polymerization procedures. Of these, an emulsion polymerization procedure is preferable.

The emulsion polymerization is carried out usually by a process wherein monomers, a polymerization initiator, an emulsifier, a chain transfer agent and other optional ingredients are incorporated in an aqueous medium, usually water, and then polymerization is conducted. The polymerization manner may be any of batchwise, semi-batchwise and continuous manners. The emulsifier includes, for example, anionic surfactants such as higher-alcohol sulfuric acid ester salts, alkylbenzenesulfonic acid salts, and sulfonic acid salts of aliphatic carboxylic acid ester; nonionic surfactants such as polyethylene glycol alkyl esters, polyethylene glycol alkyl phenyl ethers, and polyethylene glycol alkyl ethers; and amphoteric surfactants which have an anionic moiety such as a carboxylic acid salt, a sulfuric acid ester salt, a sulfonic acid salt, a phosphoric acid salt or a phosphoric acid ester salt, and a cationic moiety such as an amine salt or a quaternary ammonium salt. The polymerization initiator includes, for example, a peroxide catalyst comprising an inorganic peroxide such as hydrogen peroxide or potassium persulfate, or an organic peroxide such as cumenediisopropylbenzene paramenthane, and a redox catalyst comprising a combination of an inorganic or organic peroxide, as mentioned above, with a reducing agent such as a divalent iron salt or tetraethylenepentamine. The polymerization temperature is preferably in the range of 0 to 50° C.

The rubber composition of the present invention comprises the above-mentioned nitrile rubber having incorporated therein an organic sulfonic acid salt.

The organic sulfonic acid salt used in the present invention includes aliphatic sulfonic acid salts, aromatic sulfonic acid salts, aliphatic aminoethylsulfonic acid salts and fluorinated aliphatic sulfonic acid salts. Of these, aliphatic sulfonic acid salts having an alkyl group with 5 to 50 carbon atoms, aromatic sulfonic acid salts having an alkyl group with 5 to 50 carbon atoms, aliphatic aminoethylsulfonic acid salts having an alkyl group with 5 to 50 carbon atoms, and fluorinated aliphatic sulfonic acid salts having a perfluoroalkyl group with 5 to 50 carbon atoms or a partially fluorinated alkyl group with 5 to 50 carbon atoms are preferable. As for the kind of cation in the organic sulfonic acid salt, alkali metals and ammonium are preferable. More specifically, alkali metal salts such as lithium, sodium, potassium, rubidium and cesium salts are preferable. An organic sulfonic acid sodium salt and an organic sulfonic acid lithium salt are especially preferable.

As specific examples of the organic sulfonic acid salt, there can be mentioned alkali metal salts of an aliphatic sulfonic acid having an alkyl group with 5 to 50 carbon atoms, such as sodium hexadecylsulfonate, sodium dodecylsulfonate, lithium dodecylsulfonate and sodium α-olefinsulfonate (called AOS); ammonium salts of an aliphatic sulfonic acid having an alkyl group with 5 to 50 carbon atoms, such as ammonium hexadecylsulfonate and ammonium dodecylsulfonate; alkali metal salts of an aromatic sulfonic acid having an alkyl group with 5 to 50 carbon atoms, such as sodium naphthalenesulfonate and sodium dodecylbenzenesulfonate; alkali metal salts of an aliphatic aminoethylsulfonic acid having an alkyl group with 5 to 50 carbon atoms, such as sodium salt of N-methyllauroyltaurine, sodium salt of oleyltaurine and sodium salt of N-methyloleyltaurine; and alkali metal salts of a fluorinated aliphatic sulfonic acid having a perfluoroalkyl group with 5 to 50 carbon atoms or a partially fluorinated alkyl group with 5 to 50 carbon atoms, such as lithium perfluorooctanesulfonate and sodium perfluorooctanesulfonate. Of these, sodium dodecylbenzenesulfonate and sodium salt of N-methyllauroyltaurine are preferable. These salts may be used either alone or as a combination of at least two thereof.

The amount of an organic sulfonic acid salt is preferably in the range of 0.5 to 20 parts by weight, more preferably 0.7 to 10 parts by weight and especially preferably 1 to 8 parts by weight, based on 100 parts by weight of the nitrile rubber. When the amount of organic sulfonic acid salt is too small, the heat aging resistance is poor. In contrast, when the amount of organic sulfonic acid salt is too large, bloom tends to occur on the surface of a vulcanized rubber article.

A vulcanizing agent can be incorporated in the rubber composition of the present invention which is thereby rendered vulcanizable.

The vulcanizing agent includes sulfur and sulfur-containing vulcanizing agents, and organic peroxide vulcanizing agents. As specific examples of the sulfur-containing vulcanizing agent, there can be mentioned thiuram compounds such as tetramethylthiuram monosulfide or disulfide; and morpholine compounds such as morpholine disulfide and 2-(4'-morpholinodithio)benzothiazole. The amount of sulfur or sulfur-containing vulcanizing agent is preferably in the range of 0.1 to 10 parts by weight, more preferably 0.2 to 7 parts by weight and especially preferably 0.3 to 5 parts by weight, expressed in terms of the amount of sulfur and based on 100 parts by weight of the nitrile rubber. If the amount of the sulfur or sulfur-containing vulcanizing agent is too small, the vulcanization density is low and the permanent set is increased. In contrast, if the amount of the sulfur or sulfur-containing vulcanizing agent is too large, the flexural fatigue resistance tends to become poor and the dynamic heat build-up is liable to be enlarged.

The sulfur and sulfur-containing vulcanizing agent are usually used in combination with a vulcanization accelerator and an accelerator activator. The vulcanization accelerator may be conventional and includes, for example, thiuram-type, guanidine-type, sulfenamide-type, thiazole-type and dithiocarbamate-type vulcanization accelerators. The accelerator activator may also be conventional and includes, for example, zinc oxide and stearic acid. As examples of the vulcanization accelerator, there can b mentioned thiuram-type vulcanization accelerators such as tetramethylthiuram disulfide, tetraethylthiuram disulfide and N,N'-dimethyl-N,N'-diphenylthiuram disulfide; guanidine-type vulcanization accelerators such as diphenylguanidine, diorthotolylganidine and orthotolylbiguanidine; sulfenamide-type vulcanization accelerators such as N-cyclohexyl-2-benzothiazylsulphenamide, N,N'-diisopropyl-2-benzothiazylsulphenamide and N-t-butyl-2-benzothiazylsulphenamide; thiazole-type vulcanization accelerators such as 2-mercaptobenzothiazole and dibenzothiazyl disulfide; and dithiocarbamate-type vulcanization accelerators such as tellurium dimethyldithiocarbamate and zinc dimethyldithiocarbamate.

As specific examples of the organic peroxide vulcanizing agent, there can be mentioned hydroperoxides such as cumene hydroperoxide, diisopropylbenzene hydroperoxide and 2,5-dimethylhexane-2,5-dihydroperoxide; dialkyl peroxides such as dicumyl peroxide, di-t-butyl peroxide and t-butylcumyl peroxide; diacyl peroxides such as benzoyl peroxide, 2,4-dichlorobenzoyl peroxide and bis-(3,5,5-trimethylhexanoyl) peroxide; peroxy ketals such as 2,5-dimethyl-2,5-di(t-butylperoxy)hexane, 1,3-di(t-butylperoxyisopropyl)benzene, 2,5-dimethyl-2,5-di(t-butylperoxy)hexyne-3 and 1,1-di(t-butylperoxy)-3,3,5-trimethylcyclohexane; and peroxy esters such as t-butylperoxy benzoate and 1,3-di(t-butylperoxyisopropyl) benzene.

The amount of the organic peroxide vulcanizing agent is preferably in the range of 0.1 to 8 parts by weight, more preferably 0.3 to 7 parts by weight and especially preferably 0.5 to 5 parts by weight, based on 100 parts by weight of the nitrile rubber. If the amount of the organic peroxide vulcanizing agent is too small, the vulcanization density is low and the permanent set is increased. In contrast, if the amount of the organic peroxide vulcanizing agent is too large, the rubber elasticity tends to become poor.

The organic peroxide vulcanizing agent is usually used in combination with an activator. The activator includes, for example, zinc oxide, magnesium oxide, and co-crosslinking agents such as vinyl compounds, acrylic compounds, methacrylic compounds, epoxy compounds and other polyfunctional monomers. As specific examples of the co-crosslinking agent, there can be mentioned vinyl compounds such as divinylbenzene and vinyltoluene; acrylic compounds such as 2-methoxyethyl acrylate, 2-bis(4-acryloxypolyethoxyphenyl)propane, tetraethylene-glycol diacrylate and N,N'-methylenebisacrylamide; methacrylic compounds such as mathacrylic acid, methyl methacrylate, ethyl methacrylate, ethyleneglycol dimethacrylate, triethylene-glycol dimethacrylate, trimethylolpropane trimethacrylate and allyl glycidyl ether; and other polyfunctional monomers such as N,N'-m-phenylene bismaleimide, diallyl phthalate, triallyl cyanurate, triallyl isocyanurate and liquid polybutadiene.

The kind and amount of vulcanization accelerator and activator are appropriately chosen so that processability of the rubber composition for preparation thereof, processability of the composition for making a rubber article, stability during processing and molding, and properties required for a vulcanized rubber article are satisfied.

Additives other than the organic sulfonic acid salt, vulcanizing agent, vulcanization accelerator and activator, can be used, and the particular kind and amount thereof are appropriately chosen so that the effect of the invention is substantially achieved. Such additives include, for example, a reinforcer such as carbon black and silica, a filler such as calcium carbonate and clay, a softener, a plasticizer, an antioxidant(for example, an amine antioxidant such as octylated diphenylamine, and a benzimidazole antioxidant such as a zinc salt of 2-mercaptobenzimidazole), a stabilizer and a processing aid. The rubber composition can be prepared by mixing and kneading together a nitrile rubber, a vulcanizing agent, an organic sulfonic acid salt and other optional ingredients by using a kneader such as a roll, a Banbury mix r, a kneader or an internal mixer.

Vulcanization of the rubber composition can be carried out at a temperature such that the lower limit is preferably 100° C., more preferably 130° C. and especially preferably 140° C., and the upper limit is preferably 200° C. When the vulcanization temperature is too low, a substantially long time is required for vulcanization or the vulcanization density tends to be low. In contrast, when the vulcanization temperature is too high, defective moldings are liable to be produced.

The vulcanization time varies depending upon the particular vulcanizing procedure, vulcanization temperature and shape of a vulcanized article, but is preferably chosen in a range of one minute to 5 hours in view of the vulcanization density and the production efficiency.

The vulcanization procedure can be appropriately chosen from those which are employed in vulcanization of rubbers, and include, for example, press heating, vapor heating, oven heating and hot air heating.

The vulcanized rubber article of the present invention can be made by shaping the rubber composition into a desired shape and vulcanizing the rubber composition by the conventional procedure.

The present invention will now be described specifically by the following examples and comparative examples. In these examples, % and Parts are by weight unless otherwise specified.

EXAMPLES 1–3 AND COMPARATIVE EXAMPLES 1–3

A nitrile rubber, an organic sulfonic acid salt and sodium carbonate were mixed and kneaded in amounts shown in Table 1 together with the following ingredients by using a Banbury mixer.

2 parts of zinc flower #1

2 parts of zinc oxide 40 parts of carbon black ("Seast™ 116" available from Tokai Carbon K.K.)

1 part of octylated diphenylamine (antioxidant)

0.4 part of a zinc salt of mercaptobenzimidazole (antioxidant)

5 parts of a plasticizer (trimellitic acid derivative, "Adakacizer™ C-8" available from Asahi Denka Kogyo K.K.)

The ingredients in the formulation shown in Table 1 were as follows.

Nitrile rubber: hydrogenation product of butadiene-acrylonitrile copolymer rubber having a bound acrylonitrile content of 36.2%, "Zetpol™ 2000" available from Zeon Corporation, iodine value 4, Mooney viscosity ($ML_{1+4}$, 100° C.) 85

Organic sulfonic acid salt 1: sodium dodecylbenzenesulfonate

Organic sulfonic acid salt 2: sodium salt of N-methyllauroyltaurine

The thus-obtained mixture was mixed and kneaded together with the following ingredients by using a roll to prepare a rubber composition.

6.5 parts of vulcanizer (containing 40% of 2,2'-bis(t-butylperoxydiisopropyl)benzene, "Vul-cup™ 40KE" available from Hercules Co.)

1.5 parts of co-crosslinking agent (triallyl isocyanurate)

The thus-obtained rubber composition was press-cured at 170° C. for 20 minutes to give a vulcanized sheet having a thickness of 2 mm. The tensile properties of the vulcanized sheet were evaluated according to JIS K6301. The vulcanized sheet was subjected to a hot-air heat aging test at 150° C. or 170° C. in an oven, and then the tensile properties were evaluated. Rate changes (%) of the tensile properties by the hot-air heat aging are shown in Table 1.

TABLE 1

|  | Examples | | | | | Comp. Examples | | |
|---|---|---|---|---|---|---|---|---|
|  | 1 | 2 | 3 | 4 | 5 | 1 | 2 | 3 |
| Formulation of Rubber Composition (Wt. parts) | | | | | | | | |
| Nitrile rubber | 100 | 100 | 100 | 100 | 100 | 100 | 100 | 100 |
| Org. sulfonate 1 | 3 | 6 | 9 | — | — | — | — | — |
| Org. sulfonate 2 | — | — | — | 3 | 9 | — | — | — |
| Vulcanizer | 6.5 | 6.5 | 6.5 | 6.5 | 6.5 | 6.5 | 6.5 | 6.5 |
| Sodium carbonate | — | — | — | — | — | — | 1 | 3 |
| Properties of Vulcanized Rubber | | | | | | | | |
| Tensile strength (MPa) | 27.1 | 27.3 | 26.9 | 24.3 | 23.2 | 27.6 | 27.2 | 27.2 |
| Elongation (%) | 360 | 370 | 390 | 350 | 360 | 330 | 330 | 330 |
| Hardness (Duro A) | 69 | 69 | 68 | 67 | 67 | 68 | 69 | 69 |
| 150° C. Hot Air Heat Aging Resistance | | | | | | | | |
| Rate of change after 168 hrs' heat load imposition | | | | | | | | |
| Change of TS (%) | −4 | −5 | −4 | −5 | −6 | −2 | −10 | −19 |
| Change of E (%) | −7 | −6 | −6 | +3 | +3 | −15 | +9 | +12 |
| Rate of change after 336 hrs' heat load imposition | | | | | | | | |
| Change of TS (%) | −8 | −10 | −11 | −10 | −11 | −1 | −21 | −32 |
| Change of E (%) | −5 | −6 | −6 | 0 | +1 | −18 | +9 | +15 |
| 170° C. Hot Air Heat Aging Resistance | | | | | | | | |
| Rate of change (%) after 72 hrs' load imposition | | | | | | | | |
| Change of TS (%) | −3 | −4 | −4 | −9 | −10 | +4 | −10 | −22 |
| Change of E (%) | −8 | −8 | −9 | −6 | −6 | −12 | 0 | −6 |
| Rate of change (%) after 168 hrs' load imposition | | | | | | | | |
| Change of TS (%) | −15 | −24 | −27 | −41 | −15 | −17 | −16 | −12 |
| Change of E (%) | −13 | −14 | −13 | −14 | −14 | −55 | −6 | +12 |

Not, Change of TS: Rate change (%) of tensile strength
Change of E: Rate change (%) of elongation As seen from Comparative Example 1 in Table 1, when a rubber composition does not contain any of a strong base, a salt of strong base with weak acid, a salt of weak acid, and a salt of sulfonic acid, the vulcanized rubber exhibits a large change in elongation upon imposition of heat load and also exhibits a large change in tensile strength upon imposition of a large heat load.

When a rubber composition contains sodium carbonate (i.e., a salt of weak acid)(Comparative Examples 2 and 3), the vulcanized rubber exhibits a large change in elongation and tensile strength upon imposition of heat load in a fashion similar to Comparative Example 1.

In contrast, when a rubber composition contains sodium dodecylbenzenesulfonate (i.e., organic sulfonic acid salt) (Examples 1–5), the vulcanized rubber exhibits a small change in elongation and tensile strength upon imposition of heat load.

Industrial Applicability

The rubber composition of the present invention gives a vulcanized rubber article exhibiting reduced tensile strength and reduced elongation even in a hot-air atmosphere. Because of these beneficial properties, the vulcanized rubber article are useful especially as automobile parts used in hot-air atmosphere, such as an O-ring, a seal, a packing, a gasket, a diaphragm, a hose and a belt.

What is claimed is:

1. A rubber composition comprising a hydrogenated nitrile rubber having an iodine value of not larger than 120 and an organic sulfonic acid salt, wherein the amount of the organic sulfonic acid salt is in the range of 0.5 to 20 parts by weight based on 100 parts by weight of the nitrile rubber.

2. The rubber composition according to claim 1, wherein the nitrile rubber contains 10 to 60% by weight of units derived from α,β-ethylenically unsaturated nitrile monomer (a).

3. The rubber composition according to claim 1, wherein the nitrile rubber has a Mooney viscosity ($ML_{1+4}$, 100° C.) in the range of 20 to 140.

4. The rubber composition according to claim 1, wherein the nitrile rubber has been produced by emulsion polymerization, or by emulsion polymerization followed by hydrogenation.

5. The rubber composition according to claim 1, wherein the organic sulfonic acid salt is an alkali metal salt or ammonium salt of an organic acid selected from aliphatic sulfonic acids, aromatic sulfonic acids, aliphatic aminoethylsulfonic acids and fluorinated aliphatic sulfonic acids.

6. The rubber composition according to claim 5, wherein the organic sulfonic acid salt is an alkali metal salt of an aromatic sulfonic acid or an alkali metal salt of an aliphatic aminoethylsulfonic acid.

7. The rubber composition according to claim 6, wherein the organic sulfonic acid salt is a sodium salt of an aromatic sulfonic acid or a sodium salt of an aliphatic aminoethylsulfonic acid.

8. The rubber composition according to claim 7, wherein the organic sulfonic acid salt is sodium dodecylbenzenesulfonate or a sodium salt of N-methyllauroyltaurine.

9. The rubber composition according to claim 1, which further comprises a vulcanizing agent.

10. The rubber composition according to claim 9, wherein the vulcanizing agent is sulfur or a sulfur-containing vulcanizing agent, and is contained in an amount of 0.1 to 10 parts by weight expressed in terms of sulfur and based on 100 parts by weight of the nitrile rubber.

11. The rubber composition according to claim 9, wherein the vulcanizing agent is an organic peroxide vulcanizing agent, and is contained in an amount of 0.1 to 8 parts by weight based on 100 parts by weight of the nitrile rubber.

12. A vulcanized rubber article made by vulcanizing the rubber composition as claimed in claim 9.

13. The vulcanized rubber article according to claim 9, which is an automobile part selected from an O-ring, a seal, a packing, a gasket, a diaphragm, a hose and a belt.

* * * * *